United States Patent [19]

Zimmerman

[11] 4,278,279
[45] Jul. 14, 1981

[54] CAM-LOCK FITTING

[76] Inventor: Harry M. Zimmerman, 5708 Baltimore Dr. #399, La Mesa, Calif. 92041

[21] Appl. No.: 46,342

[22] Filed: Jun. 7, 1979

[51] Int. Cl.³ .................................................. F16L 33/22
[52] U.S. Cl. ..................................... 285/255; 285/23; 285/38; 285/423
[58] Field of Search ............... 285/247, 242, 255, 249, 285/248, 178, 357, 358, 38, 39, 23, 390, 394, 395, 34, 35, 423; 151/19 A, 37

[56] References Cited

U.S. PATENT DOCUMENTS

| 154,444 | 8/1874 | Bauser | 285/390 X |
| 3,635,501 | 1/1972 | Thomsen | 285/34 |
| 3,986,730 | 10/1976 | Mortelli | 285/23 |
| 4,021,061 | 5/1977 | Zimmerman | 285/13 |
| 4,162,092 | 7/1979 | Hayes | 285/39 |

FOREIGN PATENT DOCUMENTS 546525  8/1922  France ........................ 285/247

Primary Examiner—Dave W. Arola
Attorney, Agent, or Firm—Henri J. A. Charmasson

[57] ABSTRACT

A hose coupling is provided primarily for irrigation applications and features a quick-connect capability ideal for use with the flexible irrigation systems such as are used on sugar cane plantations and elsewhere requiring relatively frequent assembly and dismantling of the system, the coupling being characterized by a tubular body portion having a nipple over which a flexible irrigation hose is pulled, there being a collar on the connector body which by virtue of a pair of helical ramps is forced over the end of the irrigation hose locking it onto the nipple when the collar is twisted. Being unrestrained other than by the helical ramp structure, the collar can be pulled axially to directly engage the irrigation hose, or twisted to utilize the mechanical advantage inherent in the helical ramps so that dual alternative operative modes are inherent in the design.

11 Claims, 6 Drawing Figures

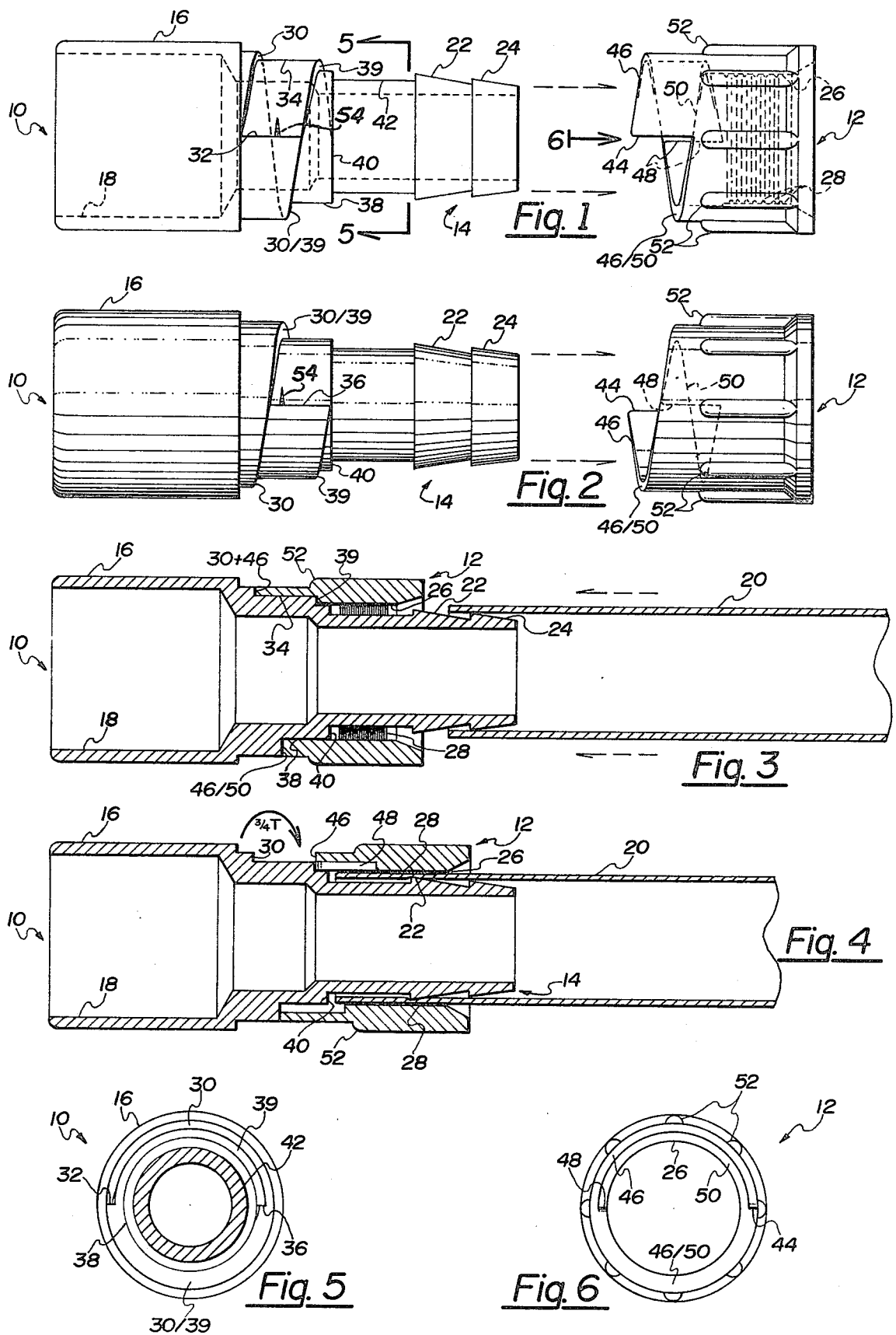

CAM-LOCK FITTING

BACKGROUND OF THE INVENTION

The invention pertains to coupling mechanisms for adjoining a length of flexible hose to another length of hose, a rigid pipe fitting, a T-intersection or anything else, and particularly relates to such a coupling or fitting as it would apply to irrigation systems.

There are numerous different types of irrigation systems, to some of which the instant invention may not apply. The area to which it particularly does apply is a specialized field of irrigation in which very lightweight, thin-walled flexible plastic tubes are temporarily, or at most semi-permanently deployed in sugar cane groves or elsewhere such that they must be dismantled and discarded after a period of time. The assembly of these units must naturally be accomplished in as rapid a time as possible because of the economics of farm labor and this in turn requires the utilization of fittings and couplings which are capable of connecting the length of thin-walled hose to pipes and the like absolutely as quickly as possible.

There has been utilized in the past a coupling which utilized an elongated tubular body portion somewhat like the one of the instant invention with a nipple onto which the end of a hose is pushed and then quickly retained thereon by virtue of a collar threadedly engaged on the coupling body which moved out to pinch a hose over the nipple as the collar is rotated on its threads, causing it to axially advance on the coupling tube.

This unit has functioned quite adequately for several years and has been sold in great quantity, but has left room for improvement in the following two areas.

First, during the coupling operation when the collar is rotated on its retaining threads, there is a tendency for the collar to cock back or skip over the threads rather than advance forward against the force of the hose as it is compressed around the nipple. Second, the only movement capable of engaging or disengaging the irrigation hose in the prior art coupling was the rotative adjustment of the collar; in other words, the collar could not be directly moved axially either onto or off of the irrigation hose but had to be rotated to effect axial motion because it was captured on the threads of the coupling body.

SUMMARY OF THE INVENTION

The present invention provides a coupling which improves in the two above-mentioned areas by eliminating the threaded interengagement between the main tubular body of the coupling and its collar and replaces these threads with a pair of helical ramps defined coaxially in the tubular coupling body and face toward the nipple end of the body. The collar has corresponding structure defining a pair of ramp-following surfaces which ride on the ramps as the collar is turned to effect a similar axially advancing motion to that of a thread and scew relationship except that the collar is also free to move directly axially with no rotation at all at the option of the user.

The helical ramps are arranged one radially inwardly and angularly displaced 180° from the other to provide a strong, non-slip positive urging of the collar over the flexible hose.

BRIEF DESCRIPTION OF THE DRAWINGS

FIG. 1 is a side elevation view of the two coupling components exploded showing hidden structure in dashed lines;

FIG. 2 is a side elevation similar to FIG. 1 but rotated 180° about the longitudinal axis;

FIG. 3 is a section taken longitudinally of the completed coupling showing a flexible hose being inserted;

FIG. 4 is a view similar to FIG. 3 but with the irrigation hose captured by the retaining collar;

FIG. 5 is a section along line 5—5 of FIG. 1; and

FIG. 6 is a elevation view taken along line 6—6 of FIG. 1.

DETAILED DESCRIPTION OF THE DRAWINGS

The coupling of the instant invention comprises a hollow, tubular member 10 ordinarily made from plastic by an injection mold process and a similarly manufactured collar 12 which slips over the end of the tube 10 having connector nipple 14 thereon. The collar is too small to pass beyond the central portion of the tube as it is blocked by the enlarged shank 16. The tube 10 is hollow, defining an internal passageway 18 from one end to the other and the shank end 16 of the tube can be shaped to fit any desired auxiliary fitting, be it male, female, or otherwise, or the tube could be part of a T-junction or a straight junction between two abutting flexible irrigation hose segments. That is to say the invention resides in the structure and manner in which the tube is retained on the tubular member 10 and is independent of the larger structure of which this coupling is a part.

The nipple 14 of the coupling tube defines external structure capable of securely engaging the interior diameter of an irrigation hose 20 shown in FIGS. 3 and 4. This hose is a thin-walled flexible hose which is so lightweight that it is effectively disposable and, in fact, is treated as dispoable in the ordinary agricultural cycle in which it is used.

The hose 20 slips over the frustacones 22 and 24, which are of slightly decreasing diameter to accommodate different sized hoses, and the end result of the operation of the structure to be described below is that the collar 12 is moved from the position shown in FIG. 3 to the position shown in FIG. 4 to securely pinch the end of the hose 20 against the gripping edges of one or both of the cones 22 and 24. This gripping action is enhanced by the slight taper of the interior surface 26 of the collar which expands to the right in FIGS. 3 and 4 such that a mechanical advantage or wedging effect is achieved by the collar as it slips to the right over the end of the hose 20. Additionally, annular friction grooves 28 may be incorporated in the surface 26 to further increase the strength by which the coupling captures the hose.

Because of the relative diameters of the parts and their arrangements as shown, the collar may be moved directly to the right, or axially, of the tube 10 to directly engage the hose, moving between the mode shown in FIG. 3 and that of FIG. 4. By the same token, the tube may be released by moving the collar directly axially to the left. Although releasing the tube is no problem, it is often desired to apply a coupling force to the collar which is greater than could easily be directly applied by a worker moving along irrigation lines at a rapid rate connecting the couplings on a high volume basis. For this reason, as was mentioned above, prior art devices ordinarily were threaded to provide a mechanical advantage to the user, i.e., the collar was rotated rather than axially displaced directly to slip it over the end of the hose. The same general principle is used in the present coupling but in a fashion such that the components are not limited to screw-on fastening, as mentioned above. To achieve this end, the tube 10 is provided with a first helical ramp 30 which is best seen from FIG. 1 begins by a relief in the tube defining an initial ledge 32 and a helically curved surface 34 orthogonally related to the ramp 30 which is in the shape of a parallelogram wrapped around 180° of a cylinder at a helical angle. At the end of the 180° parallelogram a second ledge 36 is defined by a second relieved portion 38 which continues for 360° around the tube as a triangle, one side of which defines another helical ramp 39 and the other side defines yet a third ledge 40 which is continuous around the entire circumference of the tube and drops to a cylindrical surface 42 which is reduced basically to provide a clearance space for the end of the irrigation hose when it is slipped over the nipple 14.

The interior of the collar 12 is shaped to conform exactly to the irregularities above mentioned which are defined in the middle portion of the tube 10. These include a first shoulder 14 which fits into the first ledge 32 when the two parts are fully mated as shown in FIG. 3. Continuing from an extreme end of the shoulder 44 is a helical ramp follower surface 46 best seen in FIG. 1. This surface continues 360° and at the 180° point a second shoulder is formed which similarly defines a 360° ramp follower surface 50 which slides flushly against the second helical ramp 39.

To further clarify the geometrical relationships above mentioned, reference is made to FIG. 6. In this figure it can be seen that the first ramp starts with the initiating ledge 32 and continues 180° clockwise in that figure, where it is joined by the second ramp 39 so that the two ramps are side by side in a single, helical plane for another 180°, wherein the first ramp 30 which is radially just beyond the second ramp terminates as it comes to the top of its own initiating ledge 32. The second ramp continues around to define a complete 360° terminating in the annular third ledge 40.

By providing these ramps disposed 180° around the longitudinal axis relative to one another, it will be noted that the collar is always provided with ramp support on at least two dimetrically opposite points throughout an entire 360° rotation of the collar. When the collar is first turned, its ramp follower surfaces each make complete contact with both ramps so that a full 720° of support urges the collar to the right. As the collar is turned, each of the ramp follower surfaces increasingly extends beyond the ramp surface and is thus decreasingly in contact with the respective ramp until, just prior to the collar reaching the full 360° of rotation, only two points defined by the tips of the shoulders 44 and 48 of the collar are in contact with the ramps. Just beyond the 360° turn point, the collar collapses back against the ramp to the position of FIG. 4, although in practice if a hose is in place the collar will never move far enough to permit a 360° rotation.

It should be noted that the dual action coupling capability could be achieved with a single ramp, although the above detailed advantages would be absent.

Other features to be noted are the knurls or ridges 52 on the exterior of the collar to provide adequate turning friction, and a pair of small ramp-like ribs 54 defined in the surfaces 34 and 38 adjacent the respective ledges 32 and 36. These small ribs provide an expansive pressure against the interior of the collar 12 only when it is in its completely mated position shown in FIG. 4. This is adequate to retain the collar securely, but not tightly, on the tubular member 10 until it is ready to be turned to engage the hose. The natural purpose of this is to prevent accidental separation of the two parts of the coupling in the middle of the sugar cane fields when the irrigation system is being installed.

In use, the proper number of irrigation hoses and fittings are laid out in the fields and the laborers come by and rapidly assemble the system. A quick flick of the collar is all that is required to make a strong connection between the connector and the irrigation hose, and it is intended that the frictional gripping forces exerted by the coupling on the hose be such that the unit may be manually pulled out of the hose without removing the collar if sufficient force is applied. Naturally, as an alternative, the collar can be pushed back into its seated position against the tube shank and the hose removed quite easily.

In the preferred embodiment of the invention the collar 12 progresses against the ramps 30, 39 and toward the locking position by left-hand turns (counter-clockwise). This procedure avoids the simultaneous loosening of any standard right-hand turn fitting which may be present at the other end of the connector 10. The connector could obviously be made with a standard clockwise locking movement.

Other embodiments of the invention may be designed and modification made therein without departing from the scope of the appended claims.

What is claimed is:

1. A tube connector comprising:
   (a) a hollow generally tubular body comprises a shank, a nipple of outside diameter less than that of said shank, and a central portion intermediate said shank and said nipple and being of outside diameter less than that of said nipple such that the end of a flexible hose can be received over said nipple and central portion;
   (b) a collar engaged on said body around said central portion and being axially movable from a position in axial abuttment with said shank toward said nipple, said collar having an interior surface with a taper which expands toward the nipple end of said body such that axial advancement of said collar along said body toward said nipple creates a decreasing clearance between said nipple and said interior surface, the dimensions of said nipple and interior surface being such that advancement urges said collar into increasing circumferentially pinched relation with a hose received over said nipple to securely lock same thereon;
   (c) said tubular body defining a coaxial helical ramp along the edge of said shank abutting said collar and said collar defining a ramp follower surface to slide along said ramp such that when said collar is rotatably adjusted in one direction it is axially advanced into said increasing circumferentially pinched relation with a hose on said nipple, whereby alternatively rotatation or direct non-rotational axial advancement of said collar will similarly effect locking engagement of a hose on said nipple with or without a mechanical advantage, respectively, and reverse axial displacement of said collar on said body disengages same from a hose on said nipple.

2. The structure according to claim 1 wherein said helical ramp is the first of two helical ramps, the second of which is radially inward of, axially overlaps and is axially displaced toward said nipple from, said first ramp, and further including a second ramp follower surface defined in said collar positioned and dimensioned to follow said second ramp when the first mentioned ramp follower follows said first ramp.

3. The structure according to claim 2 wherein each of said ramps include 360° of arc around the axis of said tubular body and the corresponding ends of the respective arcs are mutually angularly separated by 180°.

4. The structure according to claim 1 wherein said nipple articulates a plurality of coaxial frustacones of outside diameter sequentially decreasing in the direction away from said shank to engage different sized hoses, and said collar has an interior surface slightly outwardly flanged toward the nipple end thereof to enable the secure pinching of a hose engaged on said nipple.

5. The structure to claim 1 and including a detent rib defined in the exterior surface of said tubular body adjacent the shank portion thereof to retain said collar on said nipple by the exertion of an expansive frictional force on the interior of said collar.

6. A tube connector comprising:
 (a) a tubular body portion having a left end adapted to connect to a fluid conduit and a right end defining a nipple which is radially enlarged at least in part toward the right;
 (b) a right-facing shoulder defining a ramp said body which axially advances toward the right as it is angularly traversed;
 (c) a collar rotationally engaged on said body portion to the left of the radially enlarged portion of said nipple, and having a ramp follower surface such that as said collar is rotated in one direction it engages said ramp and it advances to the right, said nipple and collar having juxtaposed surfaces shaped to radially approach one another as said collar advances to the right, whereby a tube engaged on said nipple can be alternatively pinched due to the axial advancement of said collar either by rotating said collar against said ramp or non-rotationally advancing same axially to the right on said body or a combination of rotational and axial movement.

7. Structure according to claim 6 wherein said ramp defines a helical sawtooth which helically advances around said body and terminates at its right-most end in a shoulder which drops back to the left-most axial position of said ramp, such that as said collar is rotated, it is advanced to the right until said ramp follower reaches said shoulder, at which point said collar ceases to be advanced to the right and can be axially displaced to quickly release a tube engaged on said nipple.

8. Structure according to claim 7 wherein said helical sawtooth advances a full 360° around said body for maximum axial advancement of said collar in use.

9. Structure according to claim 6 and including a plurality of ramps around said body helically advancing to the right, and said collar includes a ramp follower surface for each of said ramps such that said collar is urged rightward at a plurality of points as it is rotated.

10. Structure according to claim 9 wherein each of said ramps defines a helical sawtooth advancing to the right as it is angularly traversed and terminates in a shoulder dropping back to the left-most axial position of the respective ramp.

11. Structure according to claim 10 wherein said ramps are two in number, each spans a full 360°, and one is radially inwardly displaced from the other.

* * * * *